US007271997B2

(12) United States Patent
Kee et al.

(10) Patent No.: US 7,271,997 B2
(45) Date of Patent: *Sep. 18, 2007

(54) PROCESSOR MODULE PACKAGING FOR A PORTABLE ELECTRONIC DEVICE DISPLAY

(75) Inventors: Martin Kee, Sammamish, WA (US); Michael S. Clarke, Mercer Island, WA (US); Rod G. Fleck, Bellevue, WA (US); Chao-Chi Chen, Sammamish, WA (US); Craig W. O'Connell, Snohomish, WA (US); Stephen L. Perrin, Lake Forest Park, WA (US)

(73) Assignee: Vulcan Portals, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/874,697

(22) Filed: Jun. 22, 2004

(65) Prior Publication Data
US 2005/0073515 A1 Apr. 7, 2005

Related U.S. Application Data

(60) Provisional application No. 60/504,165, filed on Sep. 18, 2003.

(51) Int. Cl.
*H05K 5/00* (2006.01)
*G09G 5/00* (2006.01)
*G02F 1/1333* (2006.01)

(52) U.S. Cl. ............... 361/681; 248/919; 345/169; 345/905; 349/58

(58) Field of Classification Search ............... 361/681, 361/683, 686; 379/433.01, 433.04, 433.1, 379/433.11, 433.12, 433.13; 710/303
See application file for complete search history.

(56) References Cited

U.S. PATENT DOCUMENTS

| 4,980,848 | A | * | 12/1990 | Griffin et al. ............... 361/687 |
| 5,612,520 | A | | 3/1997 | Toedtman et al. ........ 200/16 D |
| 5,632,038 | A | | 5/1997 | Fuller .......................... 395/750 |
| 5,710,607 | A | | 1/1998 | Iwamoto et al. ............. 349/660 |

(Continued)

FOREIGN PATENT DOCUMENTS

JP       2003102530 A     4/2003

(Continued)

OTHER PUBLICATIONS

Fuller, A. et al., "Auxiliary Displays For Mobile PCs", Microsoft Windows Hardware & Driver Central, Microsoft Corporation, 2004. pp. 1-30.

(Continued)

*Primary Examiner*—Jayprakash Gandhi
*Assistant Examiner*—Zachary M Pape
(74) *Attorney, Agent, or Firm*—Dorsey & Whitney LLP

(57) ABSTRACT

A processor module is packaged with a display for a portable electronic device. The display is designed to create a space within a display housing to allow a processor module to be included in the display housing. The processor module can be designed to be integral with the display housing. Additionally, the processor module can be designed to be detachable from the display housing to provide a removable processor module. The removable processor module can be replaced with another processor module having different functionality or have stand alone functionality, as well as system functionality when attached to a display lid or a portable electronic device.

7 Claims, 8 Drawing Sheets

U.S. PATENT DOCUMENTS

| | | | | |
|---|---|---|---|---|
| 5,768,163 | A * | 6/1998 | Smith, II | 708/105 |
| 5,768,164 | A | 6/1998 | Hollon, Jr. | 364/710.14 |
| 5,796,577 | A * | 8/1998 | Ouchi et al. | 361/681 |
| 5,801,793 | A | 9/1998 | Faris et al. | 349/5 |
| 6,089,459 | A | 7/2000 | Eisele et al. | 235/492 |
| 6,105,141 | A | 8/2000 | Hanlon et al. | 713/323 |
| 6,115,755 | A | 9/2000 | Krishan | 709/250 |
| 6,154,759 | A | 11/2000 | Chou | 708/110 |
| 6,240,521 | B1 | 5/2001 | Barber et al. | 713/323 |
| 6,262,883 | B1 | 7/2001 | Kim | 361/680 |
| 6,525,932 | B1 | 2/2003 | Ohnishi et al. | 361/686 |
| 6,532,149 | B2 | 3/2003 | Dhar et al. | 361/683 |
| 6,563,705 | B1 * | 5/2003 | Kuo | 361/687 |
| 6,628,653 | B1 | 9/2003 | Salim | 370/389 |
| 6,681,324 | B1 | 1/2004 | Anderson | 713/1 |
| 6,721,420 | B1 * | 4/2004 | Kubo et al. | 379/433.13 |
| 6,778,383 | B2 * | 8/2004 | Ho | 361/681 |
| 6,798,647 | B2 | 9/2004 | Dickie | 361/683 |
| 6,948,021 | B2 | 9/2005 | Derrico et al. | 710/302 |
| 6,959,328 | B1 | 10/2005 | Gillaspy et al. | 709/220 |
| 2002/0000997 | A1 | 1/2002 | Selli et al. | 345/659 |
| 2002/0026494 | A1 | 2/2002 | Suzuki | 709/214 |
| 2002/0065564 | A1 | 5/2002 | Sheriff et al. | 700/11 |
| 2002/0086719 | A1 | 7/2002 | Kedia et al. | 455/574 |
| 2002/0087225 | A1 | 7/2002 | Howard | 700/94 |
| 2002/0129288 | A1 | 9/2002 | Loh et al. | 713/320 |
| 2002/0178390 | A1 | 11/2002 | Lee | 713/320 |
| 2002/0194414 | A1 | 12/2002 | Bateman et al. | 710/303 |
| 2002/0196599 | A1 * | 12/2002 | Misawa | 361/683 |
| 2003/0041206 | A1 | 2/2003 | Dickie | 710/303 |
| 2003/0054804 | A1 | 3/2003 | Brandes et al. | 455/414 |
| 2003/0065934 | A1 | 4/2003 | Angelo et al. | 713/200 |
| 2003/0068034 | A1 * | 4/2003 | Silvester | 379/433.12 |
| 2003/0080952 | A1 | 5/2003 | Chitturi et al. | 345/204 |
| 2003/0115495 | A1 | 6/2003 | Rawson, III | 713/324 |
| 2003/0126335 | A1 | 7/2003 | Silvester | 710/303 |
| 2003/0148742 | A1 | 8/2003 | Kim | 455/90 |
| 2003/0207686 | A1 | 11/2003 | Ramanna et al. | 455/435.1 |
| 2003/0211888 | A1 | 11/2003 | Wolinsky | 463/41 |
| 2004/0019724 | A1 | 1/2004 | Singleton, Jr. et al. | 710/303 |
| 2004/0163004 | A1 | 8/2004 | Kardach et al. | 713/323 |
| 2004/0181610 | A1 | 9/2004 | Walker | 709/250 |
| 2004/0261072 | A1 | 12/2004 | Herle | 717/171 |
| 2004/0268004 | A1 | 12/2004 | Oakley | 710/303 |
| 2005/0066209 | A1 | 3/2005 | Kee et al. | 713/323 |
| 2005/0076088 | A1 | 4/2005 | Kee et al. | 709/206 |
| 2005/0237702 | A1 | 10/2005 | Kee et al. | 361/681 |

FOREIGN PATENT DOCUMENTS

| | | |
|---|---|---|
| JP | 2003180431 A | 7/2003 |

OTHER PUBLICATIONS

Thakkar, S.S. et al., "Mobile Internet PC 2004-Delivering the Vision", Intel, Intel Developer Forum, Feb. 2003. pp. 1-36.

"What is Notebook Computer?—A word definition from the Webopedia Computer Dictionary", www.webopedia.com/term/n/notebook_computer.html, last modified Jun. 16, 2004. Two pages.

* cited by examiner

PROCESSOR MODULE PACKAGING FOR A PORTABLE ELECTRONIC DEVICE DISPLAY

CROSS-REFERENCE TO RELATED APPLICATIONS

The present application claims the benefit of the filing date of U.S. Provisional Application No. 60/504,165 entitled SOFTWARE AND HARDWARE FEATURES FOR MINI-PC, filed Sep. 18, 2003, which is incorporated herein by reference.

FIELD

This relates generally to electronic devices, and more particularly to a portable electronic device, such as a handheld portable computer, having a processor module packaged with a display of the portable electronic device.

BACKGROUND

Electronic devices have become indispensable tools for business and personal use. Portable electronic devices, such as "laptop" or "notebook" computers (i.e., portable computers), have become increasingly popular because of their portability, their use as communication terminals providing access to the Internet, and the wide variety of applications that can be operated on them. In the particular case of portable computers, a significant limitation affecting their usefulness is the limited useful life of the batteries that power them. As a consequence, the batteries for these devices must often be recharged. An added limitation is the weight and bulk of portable computers, which often renders them difficult to carry in many instances.

Another limitation of conventional portable electronic devices is the inability to use them to quickly review a limited amount of information, such as to look up a phone number or an address. Conventional portable electronic devices, such as portable computers, are structurally designed with a flat panel display positioned in a lid that is mounted to a chassis by a hinge. The lid on such devices must be opened to view the display. Additionally, before a portable computer can be used to access information, it must be turned on and it then must "boot up" by running an initialization sequence and loading an operating system. This entire process can become burdensome for users since it can require considerable time and is a significant limitation. A further limitation is the necessity to open a portable computer to turn it on and to access information. It can be very difficult to perform both functions in certain instances, such as when driving a car or when sitting in the small confines of an aircraft seat.

An alternative approach for making portable computers more convenient involves including auxiliary components (e.g., displays, control buttons, etc.) that are accessible when a lid of a computer is closed. An example of this type of portable computer is one that includes a small display on an outer surface of the lid. A subset of the pixels in a larger main display on the inner surface of the lid is mapped to the small display, which can be viewed when the lid of the computer is closed. Although such a computer does allow some information to be viewed on the small display when the lid is closed, these small displays often have limited usefulness because of the inherent limitations of conventional lid designs.

Furthermore, conventional design practices avoid placing electronic circuits in the lid which perform functions that are completely unrelated to the operation of the larger main display. Thus, the auxiliary components that are included in the lid are rarely more than simple components with limited functionality supported by electronic circuitry located in the chassis of the portable computer. Another conventional design practice is to minimize the form factor of portable computers, including the overall thickness of a portable computer. To this end, the lids of some smaller conventional portable computers exhibit a tapered profile where the thickness of the lid decreases from the hinged edge attached to the chassis to the opposite edge of the lid to reduce or eliminate unused space in the lid behind the larger main display. Other conventional lid designs exhibiting a relatively constant thickness are designed to accommodate multiple light sources that can be used as a backlight for the larger main display rather than for the accommodation of additional electronic circuits that are unrelated to the operation of the larger main display.

In addition to these design practices, certain technical constraints further limit the extent to which additional electronic circuitry can be added that can provide the functionality required to implement auxiliary components used in the lids of portable computers. Among these constraints are a limited ability to provide a sufficient number of electrical connections through a small moving hinge, and a limited ability to manage effectively the magnitude and extent of electromagnetic interference between the electrical signals generated by the larger main display of a portable computer and the electrical signals used by radio-frequency ("RF") circuits.

Therefore, there is a need for an alternative approach for packaging the main displays of portable electronic devices that would permit the integration of auxiliary components with these displays to enhance the functionality provided by these types of devices.

SUMMARY

One preferred aspect provides a processor module packaged with a display for a portable electronic device. In one aspect, a lid for a portable electronic device is pivotally attached to a chassis and has a first interior region in which a panel display is located. A second interior region of the lid is located adjacent a rear surface of the panel display in which a display driver circuit is located. The lid further includes a third interior region in which a digital processing circuit and a user interface device coupled to the digital processing circuit are located. The user interface is accessible from a rear surface of the lid and the third interior region of the lid is located adjacent the rear surface of the panel display and adjoining the second interior region.

DETAILED DESCRIPTION

Figure 1:
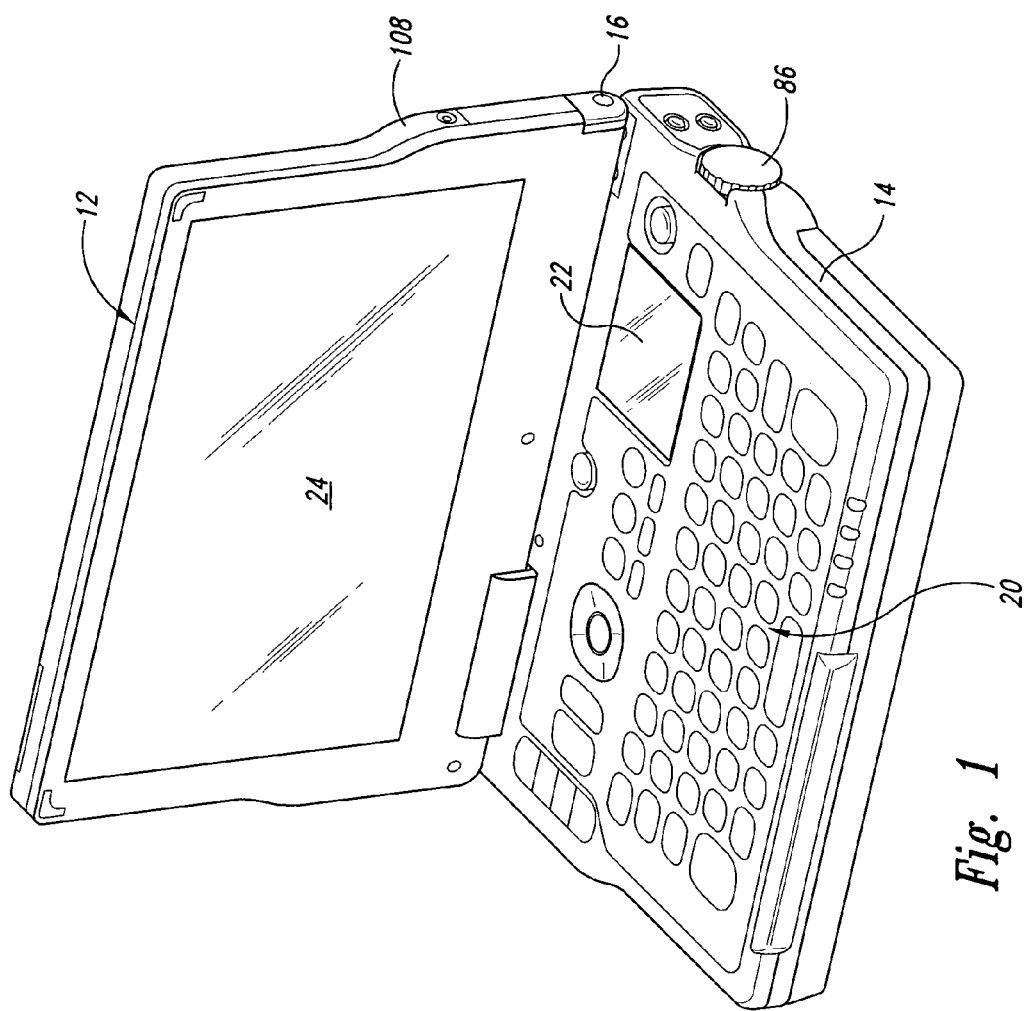
FIG. 1 is an isometric view of a portable electronic device having a lid in an open position in which embodiments can be utilized.

A portable electronic device 10 according to one embodiment is shown in FIG. 1. In one embodiment, the portable electronic device 10 has a "clam shell" structure formed by a lid 12 pivotally mounted to a chassis 14 at one edge 16. A keyboard 20 covers substantially the entire inner surface of the chassis 14 except for an area occupied by a touchpad 22 pointing device. A main display 24 is framed by a front cover 108 of the lid 12 and is visible when the lid 12 is in an open position. The portable electronic device 10 is turned on by pressing an appropriate key on the keyboard 20, and the keyboard 20 is used to enter alphanumeric data. The portable electronic device 10 includes an internal battery (not shown) as well as in internal AC powered battery charger (not shown) to provide power. Although the portable electronic device 10 may be substantially the size of a conventional notebook computer, i.e., on the order of 250 mm by 300 mm in plan form, it is preferably only slightly larger than a conventional PDA, i.e., on the order of 100 mm by 150 mm with a thickness of about 25 mm.

Figure 2:
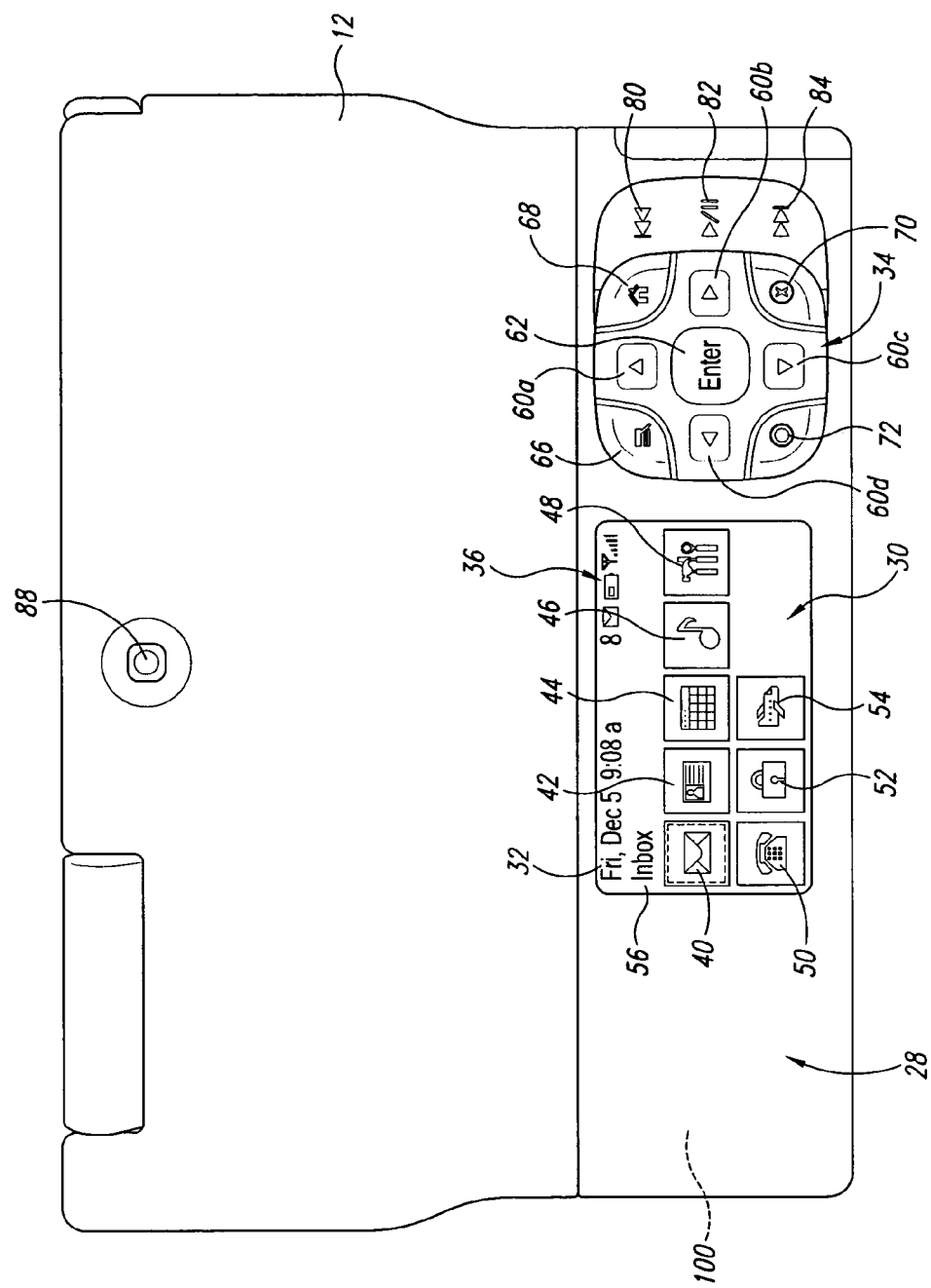
FIG. 2 is a top plan view of the surface of the lid of the portable electronic device of FIG. 1.

With reference to FIG. 2, the lid 12 includes a processor module 100 that includes an auxiliary touch-screen display 30 and a membrane keypad 34. Shown on the display 30 are the current date and time 32, status icons 36, including status indicators showing the number of new e-mail messages, the charge status of an internal battery, and the signal strength for an internal cell phone application. The touch-screen display 30 also includes an icon 40 for accessing the "Inbox" of an e-mail application, an icon 42 for accessing a contacts application, an icon 44 for accessing an appointment calendar application, an icon 46 for accessing an audio player application, an icon 48 for accessing an voice memo application, an icon 50 for accessing a modem, an application 52 for locking the system, and an icon 54 for turning off wireless functionality when flying in an airplane. The functions represented by each of these icons 40-54 can be selected by pressing the icon on the touch-screen display 30. The particular icon 40-54 that is selected is shown in the display 30 at 56.

The keypad 34 includes directional keys 60a-d that perform different functions depending on which application is being accessed. The directional keys 60a-d are used to move a cursor up, to the right, down, and to the left, respectively, when alphanumeric text is shown in the touch-screen display 30. When the audio player application is active, the directional keys 60a,c are used to increase or decrease the volume, respectively, and the directional keys 60b,d are used for respectively moving forwardly or a rearwardly in an audio selection. The directional keys 60a-d surround an Enter key 62 that is used in a conventional manner. The keypad 34 also includes a menu key 66 that causes menu items to be shown in the touch-screen display 30, a home key 68 that causes the display 30 to show the icons 40-54 illustrated in FIG. 2, an "Esc" or cancel key 70 that is used to cancel a current selection, and an Enter key 72 that essentially performs the same function as the Enter key 62. Where an internal cell phone application is available, the keys 70 and 72 act as "end call" and "call" buttons, respectively. Also included with the keypad 34 are three audio control keys that are used when the audio playback application is active. These audio control keys are a key 80 for selecting a previous track, a play/pause key 82, and a next track key 84, which are used in a conventional manner.

In one embodiment, the portable electronic device 10 includes a side wheel 86 (shown in FIG. 1) mounted on the side of the portable electronic device 10 that can be rotated in either direction by manipulating the wheel 86 with a thumb, or pressed inwards (along the axis of rotation) to generate a key click (generally used as enter or select). Additionally, the side wheel 86 can be used for navigating and selecting items on the touch-screen display 30. For example, the side wheel 86 allows a user to scroll through menu items shown on the touch-screen display 30 when either the menu key 66 or an application running on the portable electronic device 10 displays a menu. The side wheel 86 can also be used for other functions that are supported by the processor module 100, such as a "zoom" control in certain applications to change the scale at which an item is shown on the touch-screen display 30 or on the main display 24. Finally, the side wheel 86 may be used to configure the portable electronic device 10, such to adjust the contrast of the main display 24 and the touch-screen display 30, to toggle the touch-screen display 30 on and off, to control the volume of internal speakers, etc. As also shown in FIG. 2, the computer system also includes a video camera lens 88 that allows video frames to be saved as a video file, and may be used with a Webcam application. Other embodiments of the portable electronic device 10 may have a physical structure and user interface that are different than those shown in FIGS. 1 and 2. For example, other user interface devices may be substituted for the keyboard 20, main display 24, side wheel 86 and other components of the portable electronic device 10. Similarly, other user interface devices may be substituted for the keypad 34 and auxiliary display 30 in the processor module 100.

The processor module 100 may be used to provide access to the applications corresponding to the icons 40-54 when the lid 12 is closed and the portable electronic device 10 is turned off or is in a lower-power state. As explained in greater detail below, the applications corresponding to the icons 40-54 are executed by a low power processor that consumes relatively little power. Therefore, the processor module 100 can be used to perform key tasks like checking e-mails, viewing contact and calendar information, and recording voice memos when the portable electronic device 10 is in a low power mode. When the portable electronic device 10 is turned on, a high power processor is used to provide all of the functionality of the portable electronic device 10, and it consumes a substantial amount of power at that time.

Figure 3:
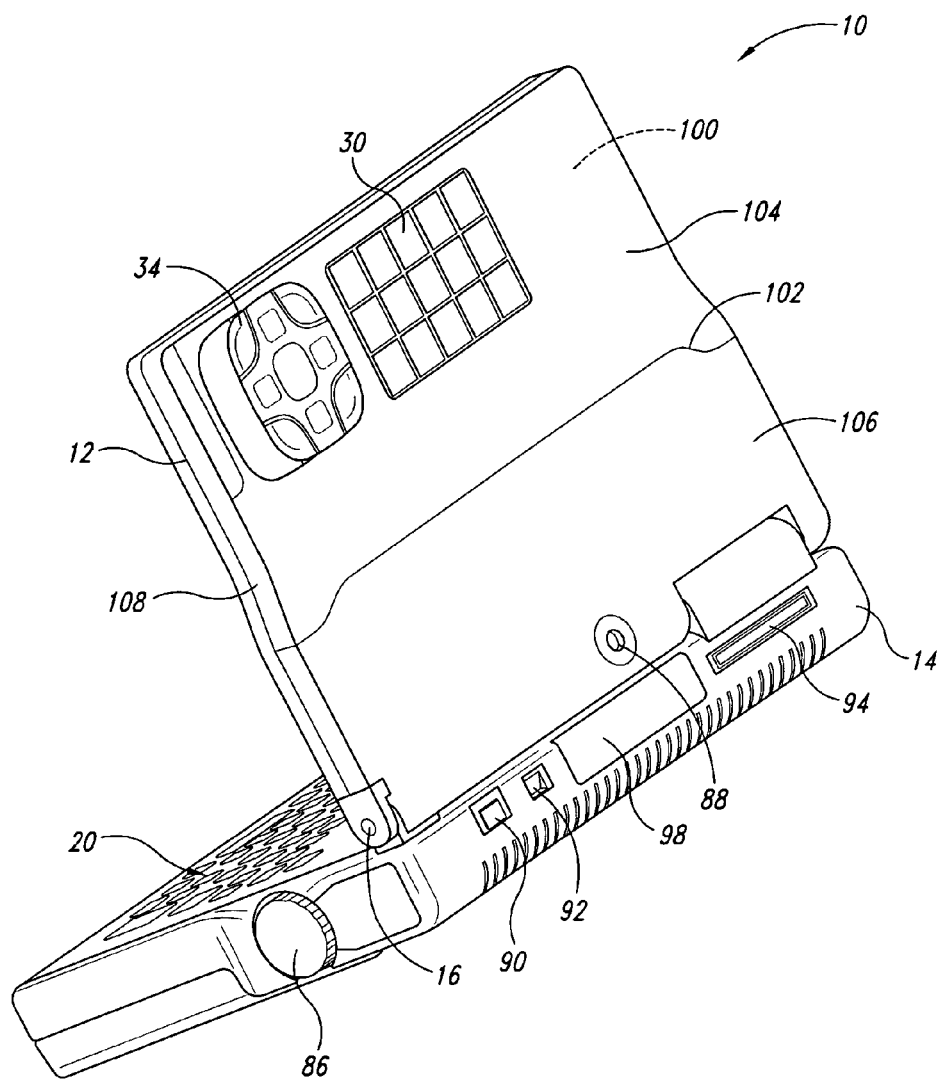
FIG. 3 is an isometric view of a rear panel of the portable electronic device of FIG. 1 having a processor module packaged in the lid according to an embodiment.

With reference to FIG. 3, the portable electronic device 10 includes various communication ports on the rear portion of the chassis 14, including a conventional mini-universal serial bus ("USB") port 92, a conventional DC power input jack, and a docking connector 94. The docking connector 94 can be used to connect to a base unit (not shown) that can have additional communication ports to provide greater connectivity with the portable electronic device 10, as well as provide additional or alternative features to the portable electronic device 10 when connected to the base unit. The various communication ports can be used to provide communication between an external device and the portable electronic device 10. Many such peripheral devices are well known, for example, printers, digital cameras, scanners, external disk drives, and the like. Alternative embodiments of the portable electronic device 10 can provide additional or alternative communication ports to the ones illustrated in FIG. 3. For example, an Ethernet port, a modem port, or the like can be included in the portable electronic device 10 as well. The rear portion of the portable electronic device 10 further includes an antenna 98 for wireless communication. The portable electronic device 10 can be equipped with a wireless communication capability using IEEE 802.11 ("Wi-Fi"), Bluetooth, or other wireless communication protocols. The antenna 98 can be utilized for transmission as well as reception of wireless signals.

A more detailed description of a computer system similar to the computer system is provided in commonly assigned, co-pending U.S. patent application Ser. No. 10/871,871, entitled PORTABLE ELECTRONIC DEVICE HAVING HIGH AND LOW POWER PROCESSORS OPERABLE IN A LOW POWER MODE filed on Jun. 17, 2004, which is incorporated herein by reference.

Figure 4:
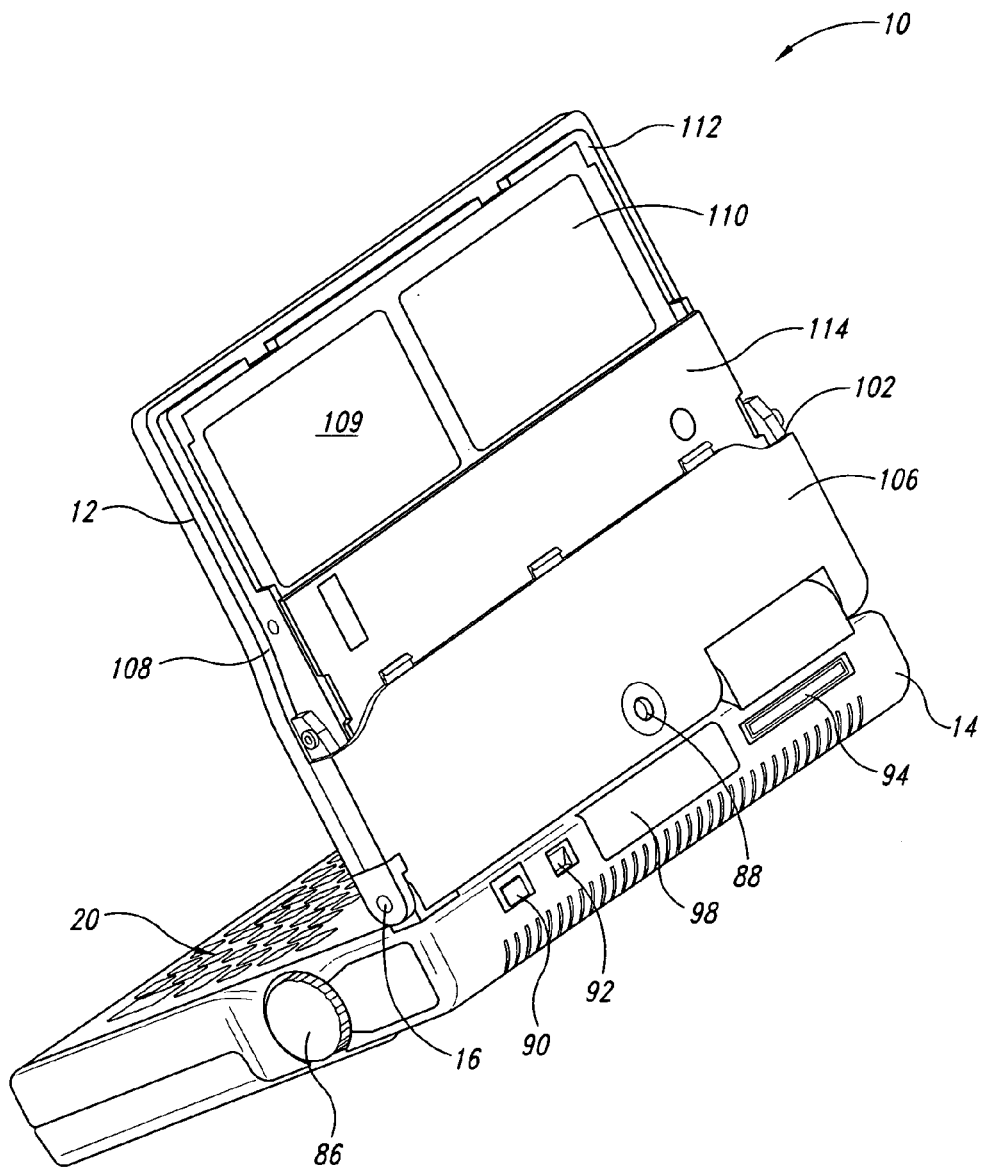
FIG. 4 is an isometric view of the rear panel of the portable electronic device of FIG. 1 having the processor module removed from the lid.

FIG. 3 further illustrates an embodiment of a processor module 100 that is integrated with the lid 12 of the portable electronic device 10. A seam 102 is shown in FIG. 3 at which a cover 104 for the processor module 100 meets a rear cover 106 of the lid 12. The cover 104 and the rear cover 106, along with the front cover 108 provide a housing in which the main display 24 and processor module 100 can be enclosed. As will be explained in more detail below, the main display 24 includes various components housed in the lid 12, such as a panel display and display driver circuits. With reference to FIG. 4, the portable electronic device 10 is shown with the processor module 100 and cover 104 removed, exposing a rear surface 110 of a panel display 109, a portion of a printed circuit board 114 on which conventional display driver circuits are mounted, and a portion of a frame 112 to which the panel display 109 and the display driver circuits 114 are attached. The term "PCB" will be used herein interchangeably with "printed circuit board." As shown in FIG. 4, the rear cover 106 covers a portion of the PCB 114 on which the display driver circuits are mounted. The display driver circuits 114 are electrically coupled to processing circuitry located in the chassis 14 and further coupled to the panel display 109 to generate appropriate signals and to drive the panel display 109 to display computer graphics images. The display driver circuits 114 and the processor module 100 are coupled to obtain power from the internal battery or from an external DC power source through the internal power circuitry in the chassis 14. Coupling to circuitry in the chassis 14 can be made through a flexible printed circuit ("FPC") or cable connection through a hinge attaching the lid 12 to the chassis 14.

Some details of the main display 24 will be referenced generally in FIG. 4, and in other cases, have been omitted from various embodiments. For example, in an embodiment utilizing a panel display requiring a light source (not shown), a light guide for directing light from the light source can be referred to generally as being part of the rear surface 110 of the panel display 109.

Figure 5:
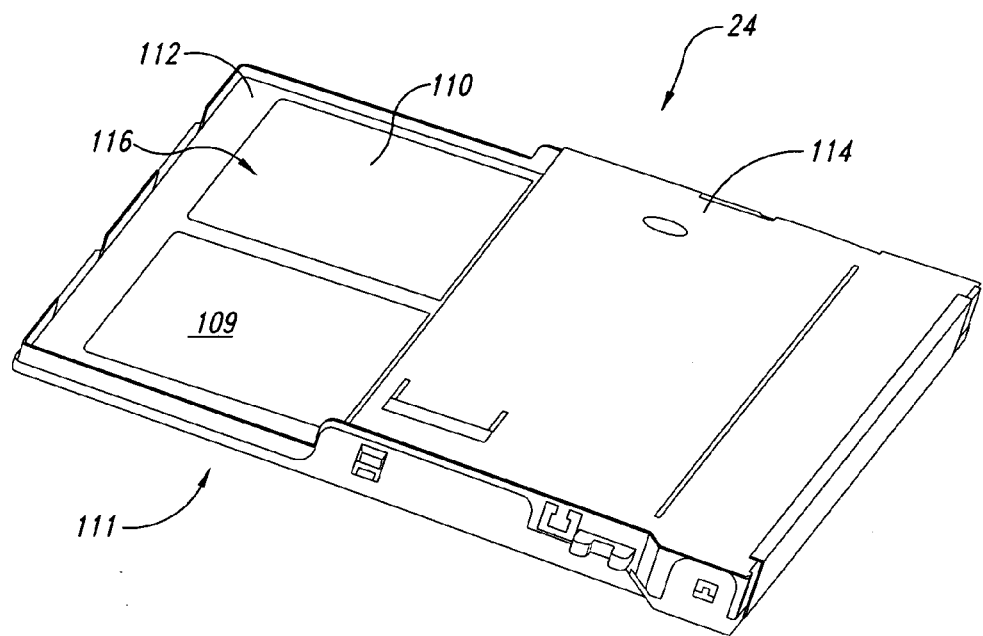
FIG. 5 is an isometric view of a display according to an embodiment that can be used in the lid of the portable electronic device of FIG. 1.

FIG. 5 illustrates an embodiment of the main display 24. The main display 24 includes a panel display 109 having a front surface 111 and a rear surface 110. In various embodiments, the main display 24 can use conventional panel display technologies, such as, for example, liquid crystal display ("LCD"), thin film transistor ("TFT"), plasma display, light emitting diode ("LED"), organic light emitting diode ("OLED"), field emission display ("FED"). In the embodiment disclosed in FIG. 5, the main display 24 employs TFT LCD technology. However, other panel display technologies can be employed without departing from the scope of the present invention. The panel display 109 is mounted to a frame 112 constructed of material for providing support and rigidity for the panel display 109. As previously discussed with respect to FIG. 4, the main display 24 further includes display driver circuits that are mounted on a PCB 114 and are electrically coupled to the panel display 109 to generate signals for driving the panel display 109. Electric shielding is included in the main display 24 to minimize RF emissions. Conventional manufacturing techniques can be utilized in constructing the main display 24. The main display 24 is designed with the PCB mounted to a first end of the frame 112. The PCB extends a portion of the way across the rear surface 110 of the panel display 109, leaving the opposite end of the frame 112 with an unoccupied region 116 adjacent the rear surface 110 of the panel display 109. The frame 112 is designed to maintain the structural integrity of the main display 24 despite having the unoccupied region 116 behind the panel display 109.

As will be discussed in more detail below, the unoccupied region 116 can be utilized for including the processor module 100 in the lid 12. Contrary to conventional designs, a processor module is packaged in the lid/display housing by utilizing the unoccupied region 116 adjacent a rear surface of a panel display.

Figure 6:
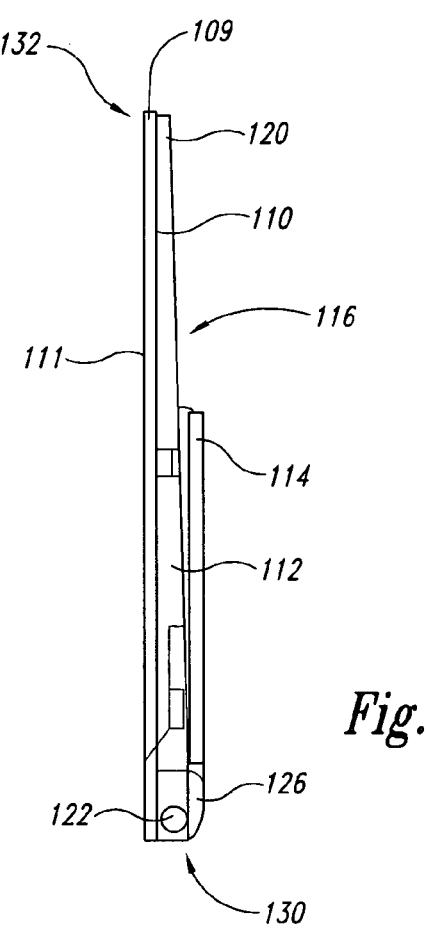
FIG. 6 is a profile view of the display of FIG. 5.

FIG. 6 illustrates a profile view of the main display 24 shown in FIG. 5. Reference numbers previously used with respect to FIG. 5 have also been used in FIG. 6 where appropriate. FIG. 6 illustrates a light source 122 and a light guide 120 for efficiently converting the light from the light source 122 into a uniform back-light for the panel display 109. In one embodiment, the light source 122 is a cold cathode fluorescent lamp ("CCFL"). However, in other embodiments, alternative light sources can be employed as well without departing from the scope of the present invention. The light guide 120 tapers from the end having the light source to a distal end, providing a generally triangular profile. The light guide 120 can be made from materials having physical and structural properties that provide a uniform back-light for the panel display 109. By using a highly efficient light guide 120, a light source located proximate to the end at which the display driver circuits mounted on the PCB 114 are located can be used to provide a back-light for the entire panel display 109.

A flexible tab connection 126 electrically couples the display driver circuits to the panel display 109. As shown in FIG. 6, the profile of the main display 24 generally tapers from a first end 130 where the display driver circuits on the PCB 114 are adjacent the rear surface 110 of the panel display 109 to an opposite end 132. The positioning of the display driver circuits at the first end and the generally triangular profile of the light guide 120 facilitates the creation of the unoccupied region 116 behind the panel display 109 and on the opposite end of the light source 122 and the display driver circuits. In the embodiment shown with reference to FIG. 4, the first end is located toward the edge 16 of the lid 12, which is pivotally attached to the chassis 14.

Figure 7:
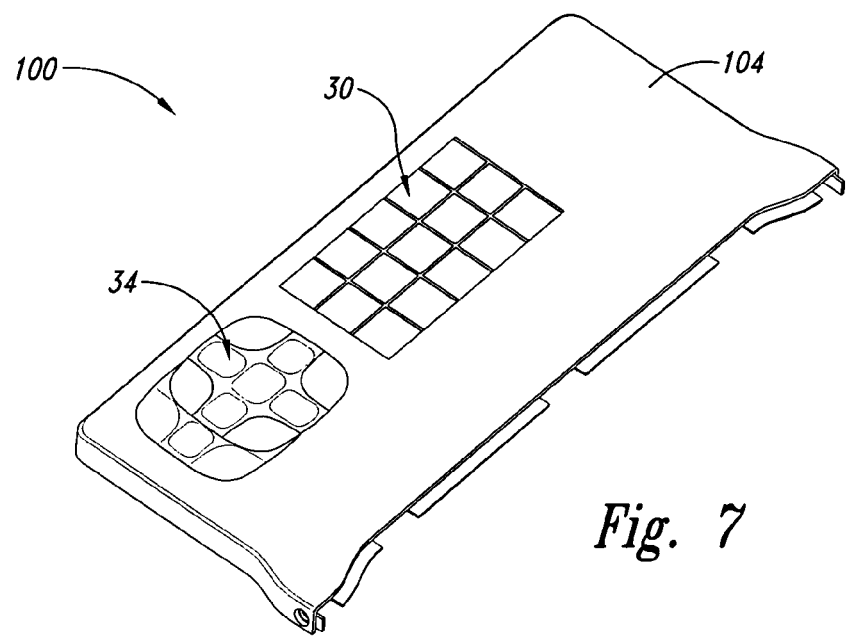
FIG. 7 is an isometric view of a processor module package according to an embodiment that can be packaged in the lid of the portable electronic device of FIG. 1.

FIG. 7 illustrates the processor module 100 (FIG. 3) and the cover 104 detached from the rear cover 106 and the front cover 108 of the lid 12. The auxiliary display 30 and the keypad 34 are exposed through an opening in the cover 104. As previously discussed, the auxiliary display 30 can be used to provide visual information to a user when the lid 12 is in a closed position. The visual information can take the form of graphical icons corresponding to various computer applications, as well as textual information. The keypad 34 can be used by the user to enter information and interact with the processor module 100.

Although referenced as separate elements, the processor module 100 and cover 104 can also be referred to collectively as the processor module 100. Additionally, the processor module 100 has been previously described as being a component of the lid 12, that is, the processor module 100 is included with the lid 12, forming an integral housing. However, in alternative embodiments, the processor module 100 can be detached from the lid 12 to provide a removable processor module. In such embodiments, the unoccupied region 116 behind the panel display 109 and opposite of the display driver circuits on the PCB 114 is utilized by the removable processor module. The removable processor module can be detached and replaced with another processor module having different functionality than the one removed. Alternatively, a removable processor module can have stand-alone functionality, as well as system functionality when attached to the lid 12. A more detailed description for a removable processing module is provided in commonly assigned, co-pending U.S. patent application Ser. No. 10/871,872, entitled REMOVABLE MODULE FOR A PORTABLE ELECTRONIC DEVICE HAVING STAND-ALONE AND SYSTEM FUNCTIONALITY filed on Jun. 17, 2004, which is incorporated here by reference. In other embodiments, the removable processor module can be replaced with a modules that provide the portable electronic device 10 with features such as expanded random access memory, expanded hard disk drive, communication using different wireless communication protocols, and the like. Thus, it will be appreciated that the term "processor module" as used herein includes both modules having any processing capability as well as those not having any processing capability.

Figure 8:
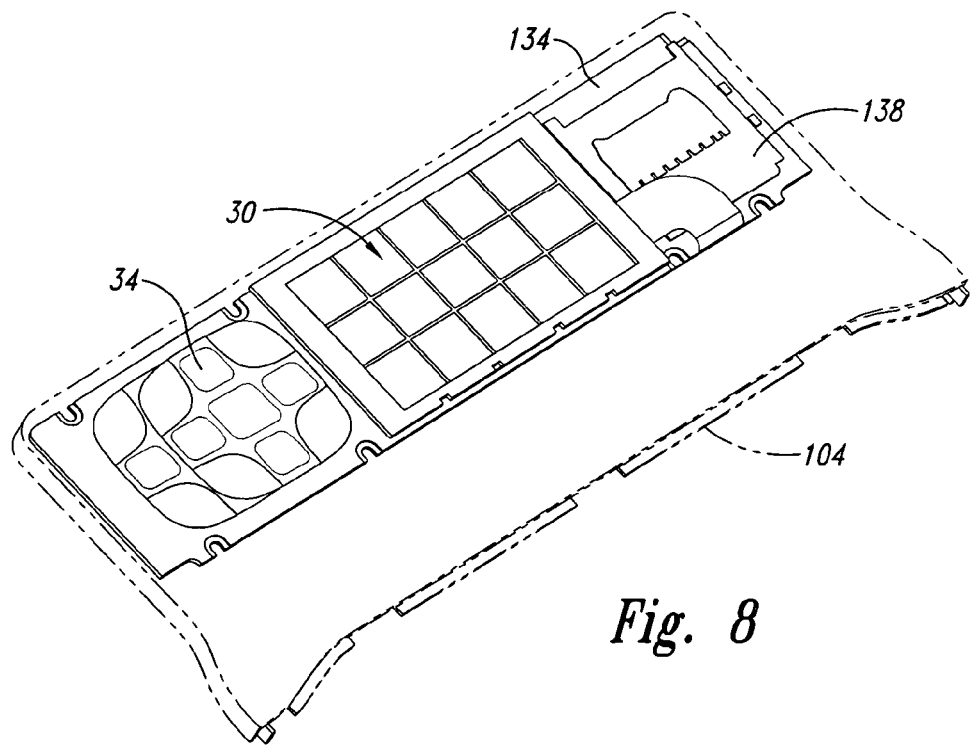
FIG. 8 is an isometric view of the processor module package of FIG. 7 with a cover portion shown in outline.

FIG. 8 illustrates the positioning of the processor module 100 relative to the cover 104, which is shown in outline. The processor module 100 is offset to one edge of the cover 104. The auxiliary display 30 and the keypad 34 are mounted on a PCB 134. A secure digital connector 138 is mounted on the PCB 134, but is not exposed through the cover 104 in the way the auxiliary display 30 and the keypad 34 are exposed. The processor module 100 is coupled to electronic circuitry located in the chassis 14 through a FPC or cable that is brought through a hinge at the edge 16. The electrical connections can be included in the same FPC or cable alongside those necessary for coupling the display driving circuits to electronic circuitry in the chassis 14.

Figure 9:
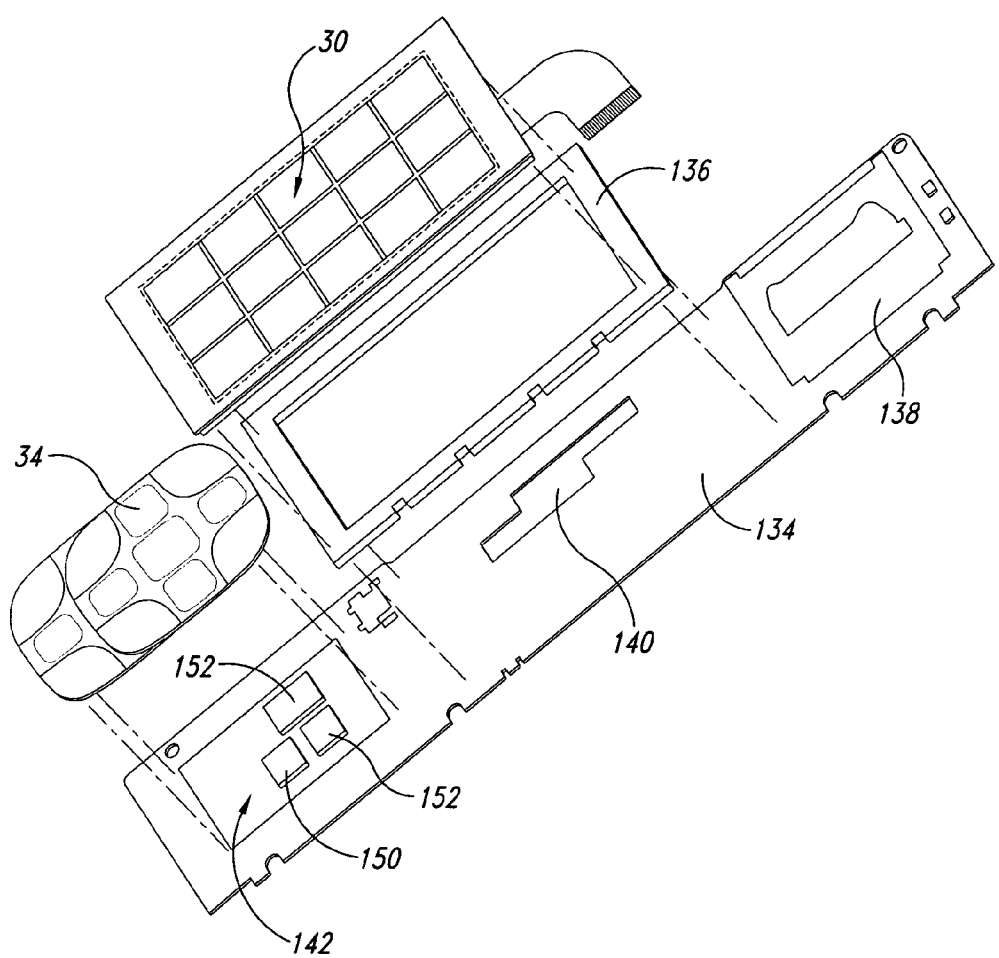
FIG. 9 is an exploded isometric view of a portion of a processor module package according to an embodiment that can be packaged in the lid of the portable electronic device of FIG. 1.

FIG. 9 illustrates the interrelationship of the auxiliary display 30 and the keypad 34 relative to the PCB 134. Electric shielding to reduce electromagnetic interference from the panel display 109 to the RF circuitry has been omitted from FIG. 9 to avoid obscuring the relative positioning of the auxiliary display 30, the keypad 34, and the PCB 134. The auxiliary display 30 is mounted to the PCB 134 using an auxiliary display gasket 136. The stacked design of the processor module 100 provides a compact construction that can take advantage of the unoccupied region 116 located behind the panel display 109 and adjacent the display driver circuits.

Electronic components 142 and a cutout 140 for auxiliary display components are located beneath the keypad 34 and the auxiliary display 30, respectively. An illustrative placement of the electronic components 142 is shown in FIG. 9. However, other placements of electronic components can be used in other embodiments. The electronic components 142 are illustrated in FIG. 9 for the purpose of providing an example of the placement of such components. The specific embodiment shown in FIG. 9 is not intended to limit the scope of the present invention. The electronic components 142 typically include electronic devices for supporting the auxiliary display 30 and the keypad 34. Additionally, the electronic components 142 include a digital processing unit 150 and memory devices 152. The digital processing unit 150 can execute software applications in the form of software instructions stored in the memory devices 152. The various devices of the electronic components 142 are conventional, and the specific devices included will depend on the desired functionality of the processor module 100. Selection of the specific devices, and implementation of the desired functionality is well within the understanding of those ordinarily skilled in the art.

The various components of the processor module 100 can be coupled to one another within the confines of the lid 12. Although, as previously discussed, the processor module 100 is coupled to electronic circuitry located in the chassis 14, the coupling between, for example, the digital processing unit 150 and the electronic devices for supporting the auxiliary display 30 and the keypad 34 does not require coupling of the user interface devices with electronic circuitry in the chassis 14 for operation. That is, with the hardware for supporting processing and operation of the auxiliary display 30 and the keypad 34 coupled to the digital processing unit 150, only connections between the digital processing 150 and electronic circuitry in the chassis 14 would be needed for their operation. Thus, the additional functionality provided by the processor module 100 does not need to come at the expense of significantly increasing the number of electrical connections that must be brought through a hinge at the edge 16 from the lid 12 to the chassis 14.

Figure 10:
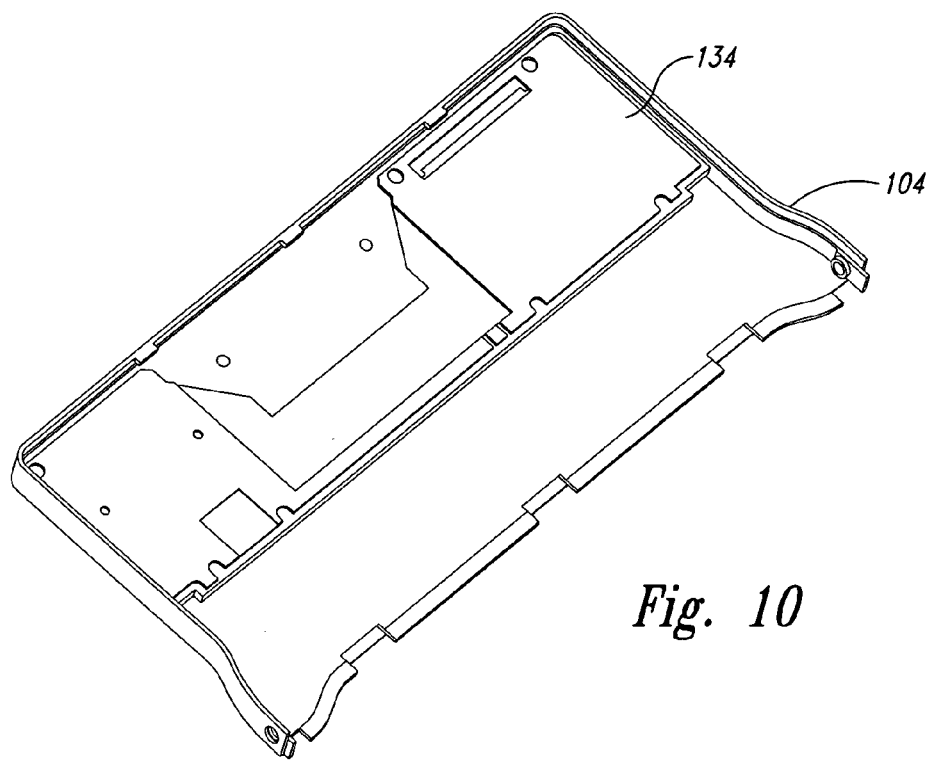
FIG. 10 is an isometric view of the underside of the processor module package shown in FIG. 7.
Figure 11:
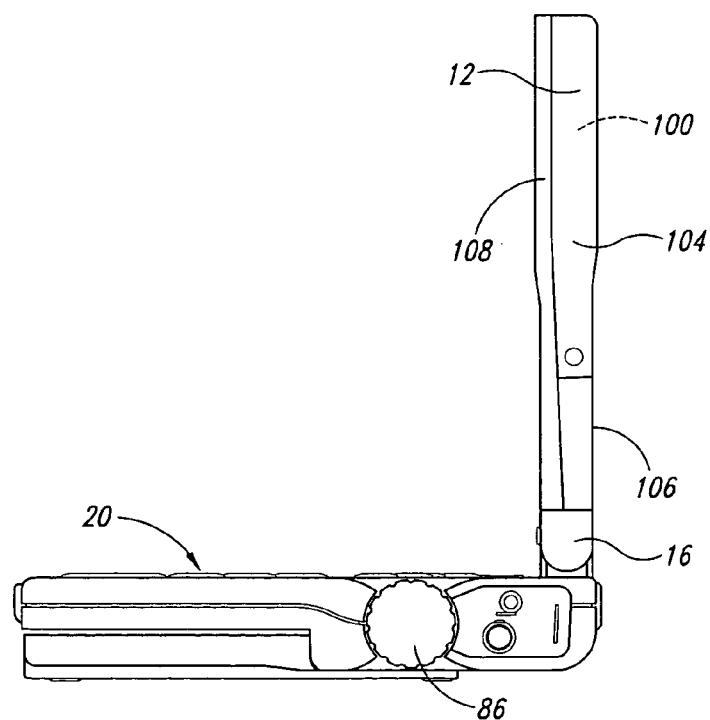
FIG. 11 is a profile view of the portable electronic device of FIG. 1 having a processor module packaged in the lid according to an embodiment.

FIG. 10 illustrates the processor module 100 positioned in a recess formed on the inside of the cover 104. The thickness of the processor module 100 is such that it can utilize the unoccupied region 116 (FIGS. 5 and 6) adjacent the rear surface 110 when attached to the lid 12 of the portable electronic device 10. As previously discussed, in one embodiment, the unoccupied region 116 is provided in part by the positioning of the display driver circuits on the PCB 114 at the first end 130 (FIG. 6) and the generally triangular profile of the light guide 120 that tapers from the first end 130 to the region occupied by the processor module 100 when attached to the lid 12. FIG. 11 illustrates how the tapered or generally triangular profile of the main display 24 enables a processor module 100 to be included in the lid 12 without impairing the appearance or the small streamlined shape of the portable electronic device 10. The thickness of the lid 12 remains substantially uniform from the hinged edge 16 to the opposite edge of the lid 12.

One skilled in the relevant art may recognize that the embodiments disclosed herein may be practiced without one or more specific details, or with other methods, resources, materials, etc. In other instances, well known structures, resources, or operations have not been shown or described in detail merely to avoid obscuring important aspects of the embodiments.

While example embodiments and applications have been illustrated and described, it is to be understood that the invention is not to be limited to the precise configuration and resources described above. For example, the display driver circuits have been previously described as being located in a display housing behind a panel display. However, in alternative embodiments, the display driver circuits are located in the chassis to which the display housing is attached, thereby providing additional space for a processor module. Accordingly, various modifications, changes and variations apparent to those skilled in the art may be made in the arrangement, operation, and details of the methods and systems of the embodiments disclosed herein without departing from the scope of the claimed invention.

We claim:

1. A portable electronic device display pivotally attached to a chassis, comprising:
    a multi-unit housing having a front cover, a rear cover, and an interior region, the front cover having an opening through which a display surface of a display located in the interior region is visible and the rear cover covering a first portion of a rear surface of the display;
    display driver circuitry electrically coupled to the display and operable to generate electrical signals to drive the display, the display driver circuitry mounted on a circuit board located in the interior region, the circuit board extending along the rear surface of the display from a first edge proximate the pivotal attachment to the chassis and partially covering the rear surface of the display;
    a processor located in the interior region adjacent a second portion of the rear surface of the display proximate a second edge of the display opposite of the pivotal attachment to the chassis and adjacent the rear surface of the display not covered by the circuit board; and
    a processor cover covering the processor and the second portion of the rear surface of the panel display.

2. The portable electronic device display package of claim 1 wherein the rear cover is proximate the pivotal attachment to the chassis.

3. The portable electronic device display package of claim 1 wherein at least a portion of the display driver circuitry is covered by the rear cover.

4. The portable electronic device display package of claim 1 wherein the processor cover includes an opening through which an auxiliary display is visible, the auxiliary display physically smaller than the panel display visible through the opening of the front cover.

5. The portable electronic device display package of claim 1 wherein the multi-unit housing and the processor cover result in a structure having a profile with generally uniform thickness.

6. A portable electronic device, comprising:
    a chassis having a keyboard located thereon;
    a lid pivotally attached to the chassis by a pivotal attachment and having an interior region in which a panel display is located, the panel display having a front surface and a rear surface opposite of the front surface, the front surface viewable when the lid is in an open position;
    display driver circuitry coupled to the panel display and operable to drive the panel display, the display driver circuitry mounted on a circuit board located in the lid, the circuit board extending along the rear surface of the panel display from a first edge of the lid proximate the pivotal attachment and partially covering the rear surface of the panel display;
    a processor located in the chassis and being coupled to the keyboard and the panel display, the processor being coupled to the display driver circuitry through a conductor extending through the pivotal attachment between the lid and the chassis;
    a user interface device mounted in the lid, the user interface device being accessible when the lid is pivoted to a closed position in which the front surface of the panel display cannot be viewed; and
    a processor module mounted in the lid, the processor module having a processor coupled to the user interface to support functionality of the user interface device, the processor located in the interior region of the lid adjacent a second edge of the lid opposite the first edge of the lid and over a portion of the rear surface of the panel display not covered by the circuit board.

7. The portable electronic device of claim 6 wherein a plurality of conductors are coupled to the user interface device to either provide signals to the user interface device or receive signals from the user interface device, substantially all of the conductors extending to the user interface device from a location in the lid so that it is not necessary to route the conductors through the pivotal attachment between the lid and the chassis.

* * * * *